Jan. 6, 1959 N. W. BELL 2,867,774

GAIN REGULATOR FOR CARRIER SYSTEMS

Filed Dec. 17, 1952

INVENTOR
N. W. BELL
BY Charles Baraff
AGENT 2,867,774

GAIN REGULATOR FOR CARRIER SYSTEMS

Norton W. Bell, Arcadia, Calif., assignor to Bell Telephone Laboratories, Incorporated, New York, N. Y., a corporation of New York Application December 17, 1952, Serial No. 326,557

2 Claims. (Cl. 333—16)

This invention relates to gain regulators for carrier communication systems, and more particularly for such systems utilizing buried coaxial cables for propagating the carrier waves.

An object of the invention is to regulate the system gain for cable temperature variations.

A feature of the invention is a thermistor buried in the ground with the cable for controlling a regulating network in the line amplifier.

Another feature of the invention is a single battery and a group of resistances in the regulating network to control the temperature regulation.

It is well known that the variation in attenuation of a coaxial cable due to temperature is proportional to $\sqrt{f}$, where $f$ is the frequency. Hence, a regulating network to achieve equalization of such a characteristic, can compensate therefor by introducing the corresponding shape in varying amounts as controlled by a thermistor.

In accordance with a preferred embodiment of the invention, gain regulation for a wide band, coaxial cable system is accomplished by a proper combination of pilot frequency regulators and thermometer regulators distributed along the cable. A regulating network in the line repeater corrects for equalization errors due to cable length and cable temperature. The amount of correction is controlled by a regulating thermistor, which is heated by:

(1) a source controlled by the amplitude of the pilot frequency signal in the case of the pilot regulator;

(2) a source controlled by a thermometer thermistor buried beside the cable in order to sense cable temperature in the case of the thermometer regulator.

Referring to the figures of the drawing.

Figure 1:
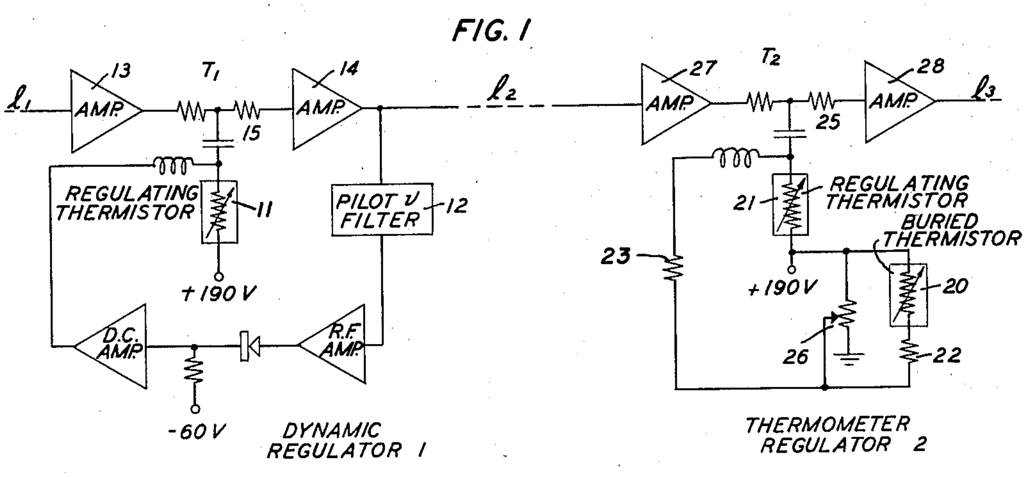
Fig. 1 shows a schematic of the wide band coaxial cable and its gain regulators in accordance with the invention.

The wide band coaxial carrier system shown in Fig. 1 has a number of polythene cable sections $l_1$, $l_2$, $l_3$, etc., each approximately four miles in length, with interposed line repeaters $T_1$, $T_2$, etc. designed for the transmission of numerous telephone channels and a wide television band.

The regulators 1, 2, associated with the line repeaters are intended to correct equalization errors due to cable length and cable temperature. Both of these effects cause gain deviations having a characteristic varying as the square root of frequency. To provide compensation therefor, these regulating networks of the line repeaters are designed to produce the corresponding inverse shape in the frequency characteristic. The pilot frequency regulator 1 is termed a dynamic regulator and its regulating network 15 is controlled by means of a thermistor 11, which is heated by current supplied by the pilot frequency picked off by filter 12 from the output of line amplifier 14. The rectified 7.266 megacycle pilot frequency heats the thermistor 11 in network 15.

Interposed between a pair of pilot regulators, are a number of thermometer regulators, having buried thermistors 20 to sense the ambient cable temperature changes and vary the regulating thermistor 21 in temperature sufficiently to compensate for the corresponding cable loss changes.

The thermometer regulator 2 avoids the use of vacuum tubes and feedback circuits as in the pilot regulator 1 and thereby achieves an appreciable economy without sacrificing accuracy in regulation. It is therefore desirable to equip as many repeaters as possible with them and a preferred proportion of pilot regulators 1 to thermometer regulators 2 is 1:3.

The coaxial cable operates in areas, where the soil temperatures vary seasonally ±25° F. around a yearly mean of 45° to 70° F. with 55° F. as the median value. The loss changes of a mean cable length ($l_2$) of four miles are +1.119 decibel at 80° F. and −1.176 decibel at 30° F. at 7.226 megacycles, the frequency of the line regulating pilot frequency $\mu$. The band width transmitted is 8.35 megacycles through polyethylene cable sections. The regulation requirement is ±5 decibels at 7.22 megacycles with an accuracy of ±.05 decibel.

In order to compensate for such cable loss changes with temperature, the thermometer regulator 2 must provide an equivalent gain variation in its associated repeater $T_2$ at the corresponding temperatures. This gain variation is effected by varying the resistance of regulating thermistor 21 by corresponding variations of the heating power supplied to the thermistor bead and controlled by the cable temperature.

The thermometer regulator 2 shown in Fig. 1 includes a directly heated, disc type thermistor 20, which is buried in the ground with the cable, so as to be subject to the same temperature variations as the cable.

The resistance of the buried thermistor varies with the cable temperature. The power applied to the regulating thermistor 21 is controlled by the series combination of resistor 22 and thermistor 20, which are branched off from the regulating network 25.

Figure 2:
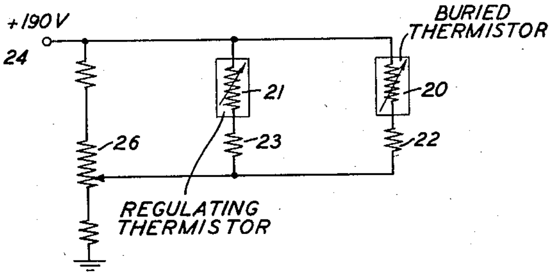
Fig. 2 shows a schematic circuit of the thermometer regulator.

A resistor 22 in series with the thermistor 20 is connected across a circuit comprising the resistor 23 in series with the regulating thermistor 21, which comprises an indirectely heated thermistor. A single 190-volt battery 24 is connected by a resistance network (see Fig. 2) including the potentiometer 26 to the thermometer thermistor 20 and the regulating thermistor 21 connected in parallel as indicated in Fig. 2. The potentiometer 26 provides a manual alignment adjustment of the thermistor circuit.

Figure 3:
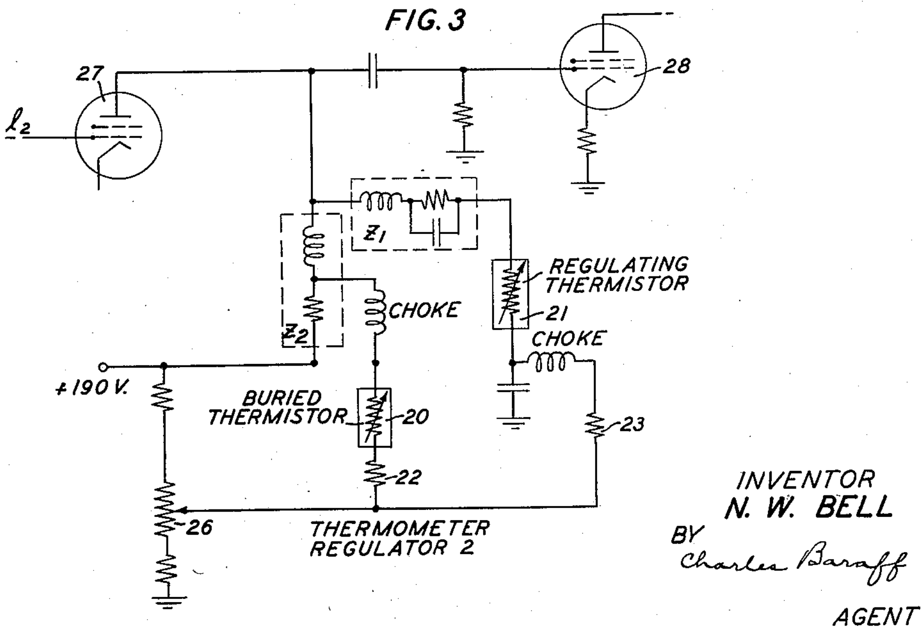
Fig. 3 shows the line amplifiers and their gain control circuit including the thermometer regulator.

Fig. 3 is a more detailed circuit diagram of the repeater $T_2$ and its associated thermometer regulator 2.

The repeater $T_2$ comprises an input amplifier 27 and an output amplifier 28 employing tetrode electron tubes in tandem. A number of such repeaters may be interposed in the line between a pair of spaced dynamic regulator repeaters $T_1$.

As shown in Fig. 3 of the drawings, the repeater comprises at least a pair of amplifier stages and an interstage network. One element of the interstage network constitutes the gain control arrangement of the invention and includes two branch circuits, respectively including regulating thermistor 21 and series resistor 23, and control thermistor 20 and resistor 22. These two branches are connected in parallel with each other for direct currents and the parallel combination is connected in series with a portion of potentiometer 26 and additional series elements across the source of heating potential indicated between +190 v. and ground. The various chokes together with networks Z1 and Z2 serve to isolate the control thermistor branch from the interstage network of the repeater for all alternating current components of the frequencies to be transmitted over the cable. The two branches, including the thermistors are, however, connected in parallel, as stated above, for the control currents.

The action of the thermometer regulator 2 is quite different from the dynamic regulator in that it is not controlled by the level deviations of a transmitted pilot signal $\mu$ but rather it is controlled by the variations in the actual temperature of the soil surrounding the buried cable. As this temperature changes, the direct current which controls the resistance of the regulating thermistor 21, changes in such a manner as to compensate for changes in the loss of the cable.

The thermistors 20 and 21 control the gain regulating network which produces cable loss equalization by acting as an interstage coupling between amplifiers 27 and 28, which provides a transmission characteristic varying as the square root of frequency ($\sqrt{f}$) over the transmitted band.

The current division between the regulating thermistor 21 and the thermometer resistor 20 is in inverse ratio to their respective resistances. This current division action occurs by virtue of the presence of the common impedance comprising the lower portion of the potentiometer winding and the resistor shown in series therewith to ground.

In describing the operation of the gain regulating circuit of the invention, it is assumed that the cable loss varies directly with temperature. Control thermistor 20 has a negative temperature characteristic and is exposed to the same changes in ambient temperature as the cable itself. Thus, as the cable loss increases by virtue of an increase in ambient temperature, the impedance of control thermistor 20 decreases. As a result, more current flows through thermistor 20 than theretofore, thus in turn, increasing the drop across the common series impedance comprising the lower portion of potentiometer winding 26 and the resistor connected in series therewith to ground. It follows that the portion of the total potential applied across the combined network which appears across the branch, including regulating thermistor 21, is decreased. The impedance of thermistor 21 varies inversely with heating current (and thus with applied potential difference) and is increased correspondingly. The shunting effect of this branch of the control network on the interstage of the repeater is accordingly reduced. It follows that the gain of the repeater is increased to compensate for the increased loss in transmission of the cable produced by the increasing ambient temperature originally assumed. It is obvious that a corresponding decrease in the gain of the repeater will be produced whenever the ambient temperature falls.

The configuration of the regulating network both for the dynamic and thermometer regulators may be of a type, such as disclosed in United States Patent No. 2,096,027 issued October 19, 1937 to H. W. Bode, and in the Bell System Technical Journal article of April 1938, pages 229–244, entitled "Equalizers" by H. W. Bode, or the like. In effect, the regulator network 2 comprises series and shunt impedances $Z_1$, $Z_2$ terminated by a variable resistance R corresponding to thermistor 21.

While there have been described what are considered to be the preferred embodiments of this invention, it will be obvious to those skilled in the art that various changes and modifications may be made therein without departing from the spirit of the invention.

What is claimed is:

1. In a cable communication system comprising at least two sections of cable interconnected by a repeater including at least two active amplifier stages and an interstage network between them, a gain regulator for stabilizing the transmission of said cable system against temperature-induced variations, said regulator comprising a control network including first and second branches connected in parallel, the parallel combination of branches being connected in series with a common resistance across a source of constant potential, a thermistor connected in said first branch and exposed to the same ambient temperature as said cable, a second thermistor in said second branch, and means connecting said second branch only as an element of said interstage network, the change in resistance of said second thermistor in response to changes in temperature of said first thermistor adjusting said interstage network to vary the gain of said repeater inversely with temperature.

2. In a communication system employing a plurality of sections of cable each having a transmission characteristic varying with ambient temperature, repeaters interconnecting adjacent cable sections and a gain regulating network for at least one of said repeaters, said network comprising first and second branches connected in parallel, said branches being connected in series with a common resistance across a source of constant heating potential, a thermistor having an inverse temperature characteristic connected in said first branch and exposed to the same ambient temperature as one of said cable sections associated with said repeater, a second thermistor connected in said second branch and having an inverse temperature characteristic, and means connecting said second branch only in shunt of the interstage transmission path of said repeater whereby the shunt impedance of the repeater interstage varies directly with temperature in response to inverse variations with temperature of the resistance of said first thermistor.

References Cited in the file of this patent

UNITED STATES PATENTS

| | | |
|---|---|---|
| 2,096,027 | Bode | Oct. 19, 1937 |
| 2,151,821 | Wilson | Mar. 28, 1939 |
| 2,208,617 | Wilson | July 23, 1940 |
| 2,345,066 | Nylund | Mar. 28, 1944 |